United States Patent
Wübbles et al.

(10) Patent No.: US 7,493,745 B2
(45) Date of Patent: Feb. 24, 2009

(54) INTAKE AND PLUCKING ARRANGEMENT

(75) Inventors: Richard Wübbles, Rhede (DE);
Norbert Wolters, Gescher (DE)

(73) Assignee: Maschinenfabrik Kemper GmbH & Co KG, Stadtlohn (DE)

( * ) Notice: Subject to any disclaimer, the term of this patent is extended or adjusted under 35 U.S.C. 154(b) by 109 days.

(21) Appl. No.: 10/370,198

(22) Filed: Feb. 20, 2003

(65) Prior Publication Data
US 2003/0131576 A1  Jul. 17, 2003

Related U.S. Application Data

(63) Continuation of application No. 09/873,004, filed on Jun. 1, 2001, now abandoned.

(30) Foreign Application Priority Data
Jun. 10, 2000 (DE) ............. 100 28 887

(51) Int. Cl.
*A01D 34/00* (2006.01)
(52) U.S. Cl. ............................................. 56/14.3
(58) Field of Classification Search ............. 56/14.3, 56/95, 110, 119, 107, 94, 14.5
See application file for complete search history.

(56) References Cited

U.S. PATENT DOCUMENTS

| | | | | |
|---|---|---|---|---|
| 2,110,471 A | * | 3/1938 | Petruchkin | 56/64 |
| 2,527,190 A | * | 10/1950 | Kuhlman | 460/28 |
| 2,571,865 A | * | 10/1951 | Greedy et al. | 56/64 |
| 2,656,666 A | * | 10/1953 | Collins | 56/111 |
| 3,832,836 A | * | 9/1974 | Anderson | 56/104 |
| 3,930,354 A | * | 1/1976 | Borderie | 56/94 |
| 4,377,062 A | * | 3/1983 | Slattery | 56/14.3 |
| 4,581,878 A | * | 4/1986 | Vida et al. | 56/114 |
| 5,787,696 A | * | 8/1998 | Wiegert et al. | 56/104 |
| 5,881,542 A | * | 3/1999 | Togami et al. | 56/98 |
| 5,913,803 A | * | 6/1999 | Moster | 56/95 |
| 6,412,259 B1 | * | 7/2002 | Wiegert | 56/60 |

FOREIGN PATENT DOCUMENTS

| | | | |
|---|---|---|---|
| DE | 2217670 | * | 10/1973 |
| DE | 4201067 | * | 7/1993 |
| DE | 19734747 | * | 2/1999 |
| FR | 1269522 | * | 10/1960 |

\* cited by examiner

*Primary Examiner*—Árpád Fábián Kovács

(57) ABSTRACT

An intake and plucking arrangement comprises a rotatable intake device that grasps a standing plant and directs it to a plucking gap. The plucking gap is located above parallel first and second stalk rolls that pull the stalk of the plant downwardly so that the plucking gap can separate the useful parts of the plant from the stalk. The upstream end of the first stalk roll is provided with a lower screw conveyor. A conveyor element is drivingly connected to the screw conveyor. The conveying element comprises an upper screw conveyor that is located above the lower screw conveyor. Both screw conveyors are located upstream from and above the inlet end of the plucking slot. The conveying element working in conjunction with the rotatable intake device direct standing plants into the plucking slot.

10 Claims, 2 Drawing Sheets

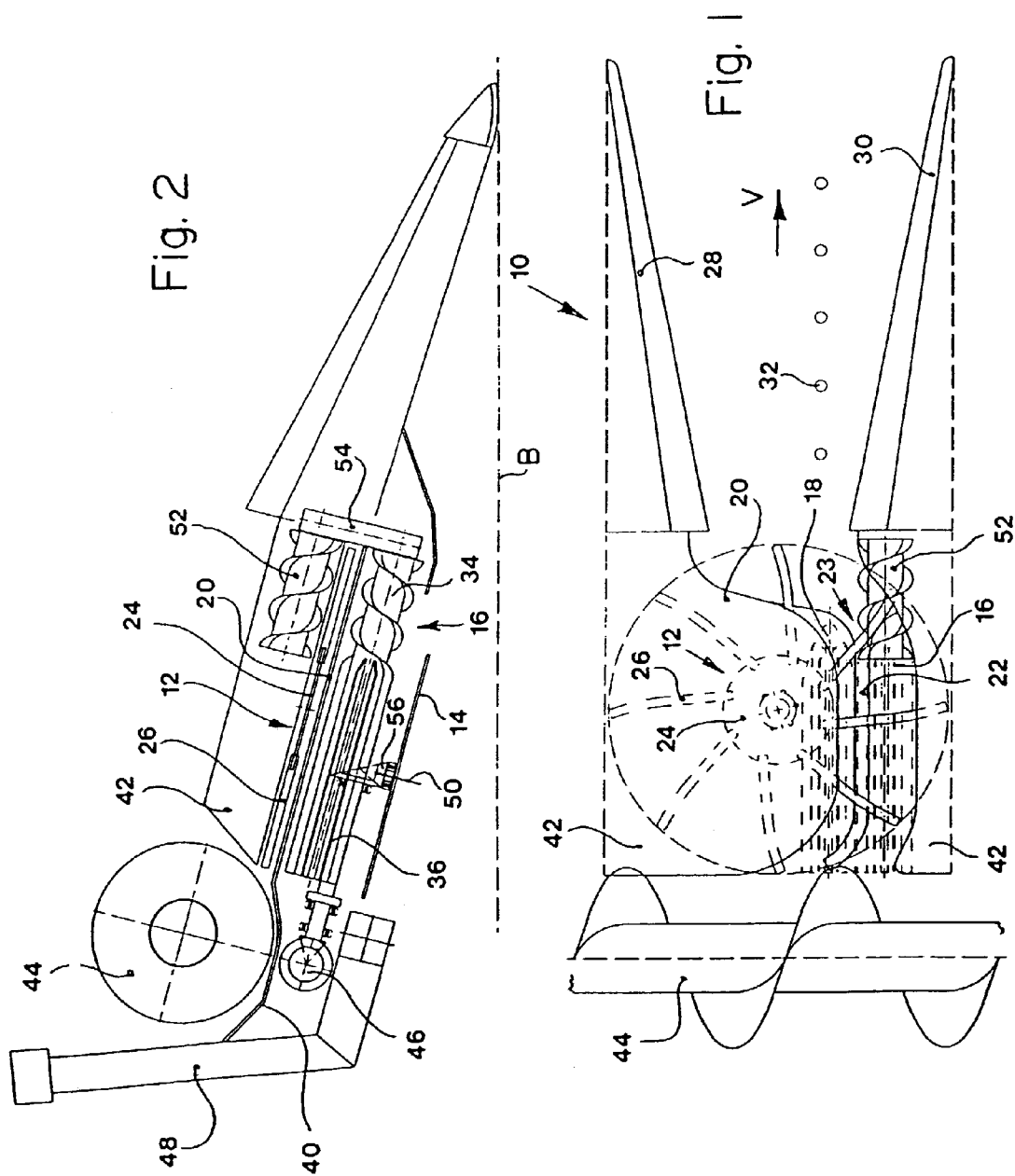

INTAKE AND PLUCKING ARRANGEMENT

This is a continuation of abandoned application Ser. No. 09/873,004, filed Jun. 1. 2001.

FIELD OF THE INVENTION

The present invention is directed to an intake and plucking arrangement, having a rotating intake device and an additional conveying element driven by a first stalk roll for directing standing plants into a plucking slot.

BACKGROUND OF THE INVENTION

DE 197 34 747 A describes a corn harvesting implement for attachment to a self-propelled harvesting machine that mows plants standing on a field independent of rows and plucks the ears of corn from the plants. For grasping and mowing of the plants independent of rows, the implement is equipped with a mower head with a rotating drum provided on its outer circumference with recesses and a knife rotating below it, as is known practice from corn heads. The plants are conducted to conventional plucking assemblies attached downstream of the mower head. Clean-up disks or points of the plucking rolls penetrating into the operating area of the mower head are provided, in order to remove the plants that are to be processed from the mower head and to conduct them to the plucking assembly. The ears of corn that have been removed from the plants are transported away by two chain conveyors arranged above the plucking slot. The disadvantage here is seen in the fact that the transition of overripe and soft stalks into the plucking assembly may prove to be problematic.

SUMMARY OF THE INVENTION

It is an object of the present invention of making available an improved intake and plucking arrangement for a crop harvesting arrangement.

The present intake and plucking arrangement comprises a rotatable intake device that grasps parts of the standing plants and directs them into a plucking slot. The intake device is preferably provided with a relatively broad operating width; it thereby operates independent of rows. In addition to the intake device, a driven conveying element is arranged upstream and above the intake end of the plucking slot. The plants transported by the intake device to the intake end of the plucking slot come into contact with the conveying element, before they have reached the plucking slot. The conveying element conveys the plants, in conjunction with the intake device, into the plucking slot. Preferably the direction of conveying of the conveying element and the longitudinal direction of the plucking slot are parallel, so that the conveying element can introduce the plants into the plucking slot without any problems.

The conveying element facilitates the introduction of the plants into the plucking slot. This is especially important respecting plants having soft stalks as the conveying element provides additional support and conveying action to the plants. Due to the supporting effect of the conveying element, a buckling or squashing of the plants between the intake device and the edge of the plucking slot need not be feared.

The conveying element is preferably a screw conveyor that extends over a region (with respect to the direction of movement of the plants) upstream of the plucking slot and over at least a portion of the length of the plucking slot. It would be conceivable to let it extend over the entire length of the plucking slot in order to transport the plants along the length of the plucking slot, however, this is not absolutely necessary, since the transport of the plants over the length of the plucking slot can be performed by the intake device. For reasons of cost and weight, a relatively short screw conveyor is therefore preferred, that covers only the intake end of the plucking slot and a region (as seen in the direction of movement of the plant) ahead and behind it. In place of a screw conveyor, a chain conveyor with drivers of the type used on corn pickers, but shortened in comparison and offset opposite to the direction of movement of the plants (that is, upstream) could be applied to the grasping and introduction of the plants into the plucking slot.

An obvious solution is to arrange the conveying element on the side of the plucking slot that is opposite to the intake device. If the plants move outward relative to the intake device, they come into contact with the conveying element. Then the conveying element conducts them into the plucking slot.

To drive the conveying element, a gearbox can be used that makes a drive connection between a driven stalk roll of the plucking device and the conveying element. It is advantageous that the gearbox be arranged on the upstream side of the stalk roll and the conveying element. As a rule, this side is located in front in the forward direction of operation of the intake and plucking arrangement.

It would be conceivable to support the conveying element at both ends on a stationary element (directly or indirectly). As a rule, however, it is sufficient to support it at only one end and to support it in bearings. Here the concern is appropriately the end of the conveying element facing the gearbox.

In a preferred embodiment the conveying element is arranged above the intake device, in particular, directly above it. This leads to the result that the plants do not bend significantly between the conveying element and the intake device, which would make the introduction into the plucking slot more difficult.

In order to further improve the introduction of the plants into the plucking slot it is proposed that the plucking device be equipped with a stalk roll that is provided with a region arranged upstream in the direction of movement of the plants in which a screw conveyor is arranged, which also transports the plants that come into contact with it into the plucking slot. The conveying element is arranged above the screw conveyor. As a result, a plant is conducted into the plucking slot by the screw conveyor of the stalk roll, by the conveying element and by the intake device. Therefore the plant is supported at three points so that a buckling even of soft plants need not be feared. As a rule, the conveying speed of the conveying arrangement, of the screw conveyor and of the intake device coincide, so that the plant is conveyed in a vertical position and is not bent due to differing conveying speeds.

The screw conveyor in the upstream region of the plucking roll and the conveying element are preferably located directly above one another. At this location the plucking rolls begin to act upon the plants and to draw them in downward.

The intake device can also be utilized to transport the plants over the effective length of the plucking device, that is, that part of the length of the plucking device in which the plucking device processes the plant, that is, draws it in and separates the useful components from the remainder of the plant.

The intake device can rotate about an approximately vertical axis and be equipped with radially extending fingers that are used to grasp and transport parts of the plants, particularly stalks.

The fingers of the intake device are preferably provided with leading surfaces with rejecting conveying performance, that is, they have a trailing configuration. This conveying performance can be attained by a curvature of the fingers of the intake device that is trailing, opposite to the direction of rotation. Thereby this results in the stalks of the plants being forced outward by the intake device and prevents the stalk from being drawn inward aggressively and becoming clamped between the edge of the sheet metal stripper plate and the finger.

BRIEF DESCRIPTION OF THE DRAWINGS

FIG. 1 is a top view of an intake and plucking arrangement of a crop harvesting arrangement.

FIG. 2 is a side view of the intake and plucking arrangement of FIG. 1.

DESCRIPTION OF THE PREFERRED EMBODIMENT

Figure 3:
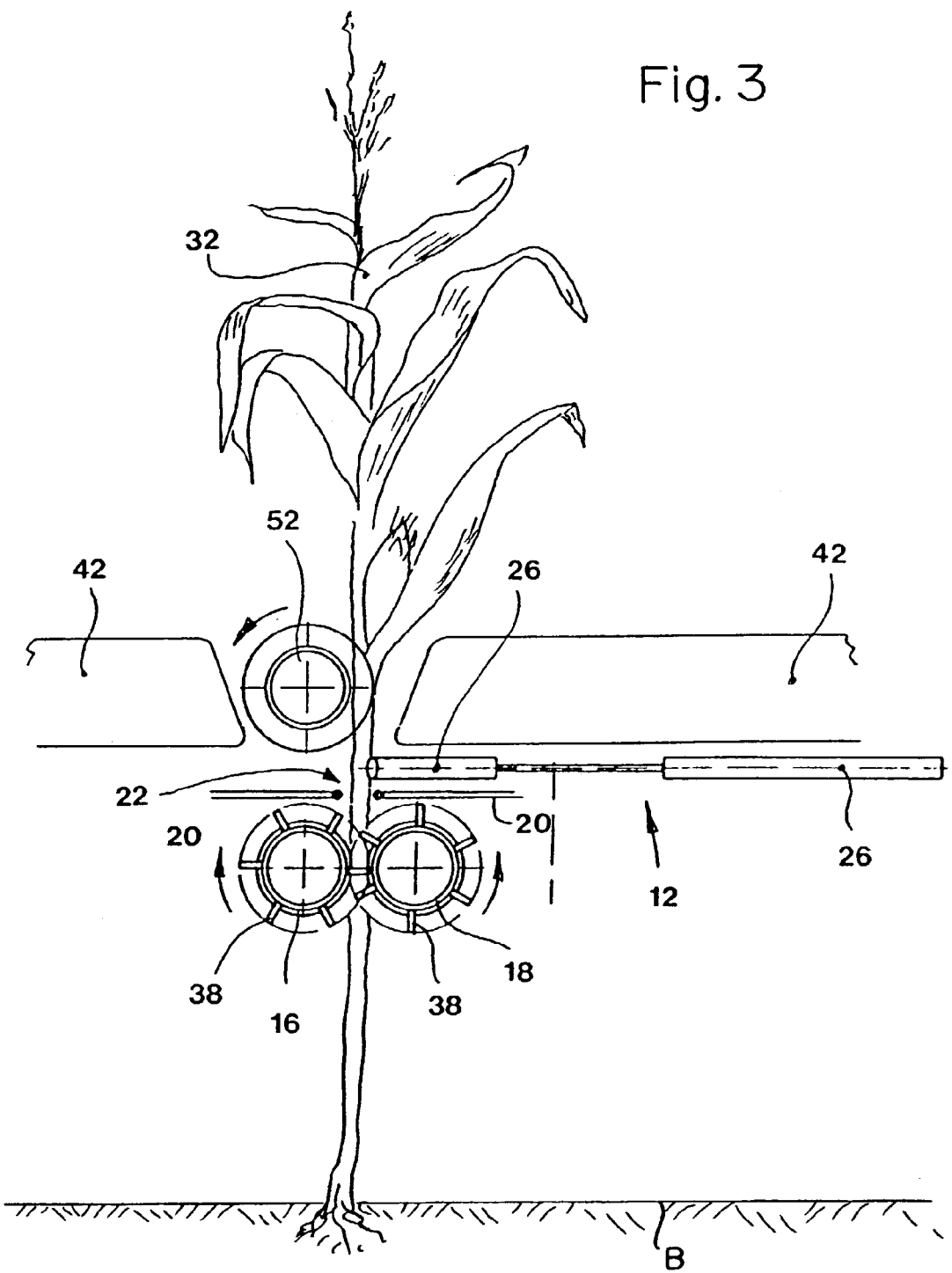
FIG. 3 is a front view of the intake and plucking arrangement of FIG. 1.

FIG. 1 shows an intake and plucking arrangement 10 of a crop harvesting arrangement. Typically, a full crop harvesting arrangement is provided with a multitude of intake and plucking arrangements 10. However, it is conceivable that a crop harvesting arrangement could be provided with only a single intake and plucking arrangement 10. If several intake and plucking arrangements 10 are applied, they may be configured identically or symmetrically about the longitudinal center plane of the crop harvesting arrangement.

The intake and plucking arrangement 10 is provided with an upper intake device 12, that is used for grasping and drawing in the plants that are to be harvested, a rotating chopper knife 14, a first stalk roll 16, a second stalk roll 18 and a sheet metal stripper plate 20 having a plucking slot 22 formed therein. Both stalk rolls 16 and 18 are located below the plucking slot 22.

The upper intake device 12 is arranged so as to rotate about a vertical axis and is rotated by a drive, not shown. The upper intake device is driven in a clockwise direction when viewing FIG 1. The intake device 12 is arranged above the sheet metal stripper plate 20 and has an axis of rotation that is inclined slightly to the front. Line B in FIG. 1 corresponds to the surface of the ground. In its basic configuration the intake device 12 comprises a central disk 24 with radially extending fingers 26 distributed around its circumference. The fingers 26 are also curved in the plane of the disk 24 opposite to the direction of rotation, in a trailing configuration. Therefore the fingers 26 have a rejecting conveying performance. Alternatively or in addition to the curvature of the fingers 26, a controlled, radial or azimuth-like movement of the fingers 26 relative to the disk 24 would be possible, as is known from harvesting reels or screw conveyors of mower heads, and can be attained by an eccentric drive, in order to attain a rejecting conveying performance.

As can be seen in FIG. 1, the intake and plucking arrangement 10 is further provided with stalk dividers 28 and 30 that are arranged ahead of the intake devices 12 and 16 in the direction of forward movement V of the crop harvesting arrangement. Intake devices 12 of the intake and plucking arrangement 10 direct or bend the stalks of plants 32 into the intake 23 of the plucking slot 22 as the crop harvesting arrangement moves in the forward direction V across a field. As illustrated in FIG. 2, the leading edge of the sheet metal stripper plate 20 in the forward operating direction is curved in such a way that the stalks of the plants 32 are directed into the operating region of the intake device 12. The operating region of the intake device 12 is so large that the intake and plucking arrangement 10 interacting with the curved leading edge of the sheet metal stripper plate 20, and/or the stalk dividers 28 and 30, allows the intake and plucking arrangement 10 to operate independently of rows. Hence the operating width of the intake and plucking arrangement corresponds to the sideways distance between the points of the stalk dividers 28 and 30.

As shown in FIG. 1, the stalk of a standing plant 32 comes into contact with a finger 26 of the intake device 12 (independent of its sideways position). The stalk of the standing plant 32 is directed by the finger 26 towards the plucking slot 22. If necessary the finger 26 is assisted by the stalk dividers 28 and 30 and/or the leading edge of the sheet metal stripper plate 20. The stalk is carried along by the leading surface of the finger 26 and is forced outwardly because of the trailing configuration of the finger 26. In this way the stalk of the plant 32 is directed by the finger 26 into the plucking slot 22. The plucking slot 22 extends approximately parallel to the forward operating direction V and is formed into the sheet metal stripper plate 20 between the first plucking roll 16 and the intake device 12.

The first stalk roll 16 is arranged on the side of the plucking slot 22 away from the intake device 12 and is inclined slightly to the front and downward when viewed from the side. The first stalk roll 16 is oriented parallel to the forward direction of operation V when viewed from the top. In the vertical direction the first stalk roll 16 is arranged underneath the sheet metal stripper plate 20. In the forward region of the first stalk roll 16, located upstream relative to the direction of movement of the plants 32, a screw conveyor 34 is located that draws in the stalk of the plant 32 into the plucking slot 22, interacting with the intake device 12. The inlet end 23 of the plucking slot 22 is located ahead of the axis of rotation of the intake device 12. The plucking gap 22 initially narrows and then has takes on a constant gap over the length of the plucking slot 22. The rearmost end region of the plucking slot 22 is curved in the direction towards the axis of rotation for the intake device 12.

When the plant 32 enters the plucking slot 22, the fingers 26 form an acute angle with the edge of the plucking gap 22 (that is shown at the bottom in FIG. 1). By reason of this acute angle between the edge of the plucking gap 22 and the fingers 26, the stalk of the plant 32 can be squashed, particularly if the stalks of the corn plants are strongly overripe and therefore soft. In this case, the plant 32 is not transported further and the intake and plucking arrangement 10 becomes jammed.

To solve this problem a conveying element 52 in the form of a screw conveyor is arranged above the inlet end 23 of the plucking slot 22 and above the intake device 12. The longitudinal direction and the direction of conveying of the conveying element 52 extends parallel to the first stalk roll 16. The conveying element 52 has approximately one-third the length of the first stalk roll 16 and is brought into rotation by a gearbox 54 which establishes a drive connection with the forward end face of the first stalk roll 16. Hence the first stalk roll 16 transmits the driving torque from the shaft 46 to the conveying element 52. The housing of the gearbox 54 is fastened to the sheet metal stripper plate 20. The conveying element 52 is supported in bearings only on its forward end face, as seen in the forward operating direction V, on the gearbox 54, but it is not supported or provided with bearings on its rear end face.

The stalk of a plant 32 grasped by the finger 26 of the intake device 12 is pressed against the conveying element 52. The conveying speed of the conveying element 52 conforms to the conveying speed of the screw conveyor 34 and the intake device 12, so that the plant 32 is conducted synchronously into the plucking slot 22 by the screw conveyors 34 and 52 and the intake device 12. The conveying element 52 provides support and conveying above the finger 26 of the intake device 12. Due to the interaction of the two screw conveyors and the finger 26 the plant 32 is held securely and conducted in a straight line into the plucking slot 22 and between the stalk rolls 16 and 18. The plant is supported at three points so that a buckling or squashing is not to be feared. In addition, due to the action of the conveying element 52, the intake performance of the intake and plucking arrangement 10 has become considerably more aggressive.

The screw conveyor 34, the conveying element 52 and the intake device 12 direct the stalk of the standing plant 32 into the operating region of the second stalk roll 18. The forward point of the second stalk roll 18 lies ahead of the axis of rotation of the intake device 12. The second stalk roll 18 is parallel to the first stalk roll 16 and is arranged between the latter and the axis of rotation of the intake device 12. The slot defined between the first stalk roll 16 and the second stalk roll 18 is located vertically underneath the plucking slot 22. The rear region 36 of the first stalk roll 16, whose length corresponds to the length of the second stalk roll 18. Both stalk rolls 16 and 18 are equipped radially extending drivers 38, which are best illustrated in FIG. 3. As seen in FIG. 3, the first stalk roll 16 rotates in clockwise direction and the second stalk roll 18 rotates in counterclockwise direction. The first stalk roll 16 and the rear region 36 of the second plucking roll 18 draw in the stalk of the plant 32 downward. At the same time the sheet metal stripper plate 20 on both sides of the plucking slot 22 is used to strip off useful components of the plant 32.

The conveying element 52 ends precisely above the forward end of the second stalk roll 18 and the beginning of the rear region 36 of the first stalk roll 16. As soon as the plant 32 is drawn downwardly by the stalk rolls 16 and 18, the conveying action by the conveying element 52 and the screw conveyor 34 of the first stalk roll 16 ceases.

During the plucking process the fingers 26 of the intake device 12 provide assurance that the plant 32 is transported over the length of the plucking slot 22. The rotational speeds of the stalk rolls 16 and 18 and the intake device 12 are preferably designed in such a way that the entire plant 32 has been drawn downwardly into the plucking slot 22 when the end of the plucking slot 22 is reached.

The useful components of the plant 32, ears of corn, sunflower heads, etc., are separated from the plant 32 by the plucking device. The useful components are conveyed by the intake device 12 into a trough 40 arranged at the rear of the intake and plucking arrangement 10. A cover 42 on both sides of the plucking slot 22 defines a channel leading to the trough 40, through which the useful components of the plants 32 are conveyed. The cover 42 partially covers the intake device 12 and the conveying element 52 and due to its shielding effect enhances the performance and operating safety of the intake and plucking arrangement 10. The trough 40 may be a one-piece unit with the sheet metal stripper plate 20, or it may be a separate element. A transverse screw conveyor 44 is arranged above the trough 40 and transports the useful components to a harvesting machine (for example, a combine or forage harvester) or to a trailer. A shaft 46 extends beneath the trough 40 and provides a drive for the two stalk rolls 16 and 18, the chopper knife 14, the conveying element 52 and the intake device 12. The shaft 46 is driven by the engine propelling the crop harvesting arrangement. A frame 48 carries the intake and plucking arrangement 10 of the crop harvesting arrangement, all of which are driven by the shaft 46.

The remainder of the plants 32, that are transported away downward by the stalk rolls 16 and 18, reach the operating region of the rotating, four-armed chopper knife 14 and are cut by this into individual pieces. Hence chopped plant remains are deposited on the field. During the chopping, the stalk rolls 16 and 18 hold the plant 32. The chopper knife 14 rotates about a vertical axis of rotation 50. The vertical axis 50 is located between the axis of rotation of the intake device 12 and the screw conveyor 44, as can be seen in FIG. 2. The chopper knife 14 is driven by the shaft 46 through an angular gearbox 56. As seen in FIG. 1, the chopper knife 14 is positioned beneath the stalk rolls 16 and 18. The direction of rotation of the chopper knife 14 is clockwise, so that the chopped crop is thrown to the side and the rear.

Having described the preferred embodiment, it will become apparent that various modifications can be made without departing from the scope of the invention as defined in the accompanying claims.

The invention claimed is:

1. An intake and plucking arrangement for a crop harvester, comprising:
   a plucking slot that separates useful portions of the standing plant;
   a rotating intake device upstream and directly above the plucking slot that grasps standing plants and directs the standing plants into the plucking slot;
   a first stalk roll and a second stalk roll beneath the plucking slot; and
   a conveying element located above the rotating intake device to convey the standing plants in conjunction with the rotating intake device into the plucking slot,
   wherein the conveying element extends substantially parallel to the plucking slot, and the rotating intake device is arranged below the conveying element and above the plucking slot.

2. An intake and plucking arrangement as defined by claim 1 wherein the conveying element is an upper screw conveyor that extends over a region upstream of the plucking slot and over at least a part of the length of the plucking slot.

3. An intake and plucking arrangement as defined by claim 2 wherein the conveying element is arranged on one side of the plucking slot and the rotating intake device is arranged on the other side of the plucking slot.

4. An intake and plucking arrangement as defined by claim 3 wherein the conveying element is driven by a gearbox arranged on its front side which is driven by the first stalk roll.

5. An intake and plucking arrangement as defined by claim 4 wherein the conveying element is supported only on the gearbox.

6. An intake and plucking arrangement as defined by claim 5 wherein the first stalk roll is provided with a lower screw conveyor which is driven synchronously with the conveying element, where the conveying element is located above the lower screw conveyor.

7. An intake and plucking arrangement as defined by claim 6 wherein the lower screw conveyor and the conveying element each have a downstream end that are located above each other.

8. An intake and plucking arrangement as defined by claim 7 wherein the rotatable intake device transports the plants through the entire plucking slot.

9. An intake and plucking arrangement as defined by claim 8 wherein the rotatable intake device is provided with radially extending fingers, the rotatable intake device is rotated about a vertical axis which is located along side the plucking slot.

10. An intake and plucking arrangement as defined by claim 9 wherein the radially extending fingers of the rotatable intake device are curved in a trailing configuration.

* * * * *